United States Patent [19]
Krawczak

[11] Patent Number: 5,752,794
[45] Date of Patent: May 19, 1998

[54] FASTENER RETENTION SYSTEM FOR A WHEEL COVER OF A VEHICLE

[75] Inventor: Lawrence E. Krawczak, Sterling Heights, Mich.

[73] Assignee: Chrysler Corporation, Auburn Hills, Mich.

[21] Appl. No.: 743,259

[22] Filed: Nov. 4, 1996

[51] Int. Cl.⁶ .............................. B60B 7/14; F16B 37/14
[52] U.S. Cl. ........................ 411/374; 411/429; 301/37.37; 301/108.4
[58] Field of Search .................... 411/149, 150, 411/374, 377, 429; 301/37.37, 108.4

[56] References Cited

U.S. PATENT DOCUMENTS

| | | | |
|---|---|---|---|
| 443,117 | 12/1890 | Sharaf | 411/429 |
| 3,871,785 | 3/1975 | Murvall | 411/374 |
| 4,240,670 | 12/1980 | Zorn et al. | 301/108.4 |
| 4,842,339 | 6/1989 | Roulinson | 301/37.37 |
| 5,253,967 | 10/1993 | Orban et al. | 411/374 |
| 5,302,069 | 4/1994 | Toth et al. | 411/429 |

*Primary Examiner*—Steven N. Meyers
*Assistant Examiner*—Robert G. Santos
*Attorney, Agent, or Firm*—Kenneth H. MacLean

[57] ABSTRACT

A fastener retention system for a wheel cover of a vehicle that comprises a stud attached to, and projecting axially from, a brake system of the vehicle. The stud includes an outer surface that has a plurality of helical threads disposed thereon. Further included is a lug nut that has an end portion including an inner surface with a plurality of helical threads disposed thereon for screwingly engaging the helical threads of the stud. The end portion of the lug nut includes an outer surface having a plurality of helical threads disposed thereon. Moreover, a nut end, integrally formed with the end portion, is included and has a plurality of ramped teeth disposed radially thereon and opposite the end portion. A decorative cap nut for covering, and fixedly attaching to, the lug nut, is also included in the present system. The cap nut has an engagement end portion including an inner surface having a plurality of helical threads disposed thereon for screwingly engaging the helical threads disposed on the outer surface of the lug nut end portion, and a axial spacer attached to the engagement end portion. The axial spacer has a lower portion including a plurality of ramped teeth disposed radially thereon for ratchetingly engaging the ramped teeth of the lug nut during tightening or loosening of the decorative cap nut.

9 Claims, 2 Drawing Sheets

FASTENER RETENTION SYSTEM FOR A WHEEL COVER OF A VEHICLE

BACKGROUND

1. Field of the Invention

In general, the present invention relates to an arrangement for a wheel cover of a vehicle. Specifically, the present invention relates to a fastener retention system for a wheel cover of a vehicle using decorative cap nuts.

2. Description of the Related Art

Lug nuts have been used in the automotive industry for many years with great success for securing wheels to vehicles. In most instances, four or more lug nuts screwingly attach to corresponding vehicle studs for fixedly holding a wheel of a vehicle in place. Although functionally adequate, lug nuts are not typically aesthetically pleasing. When wheel covers are used that do not hide the lug nuts, they protrude outward through apertures in the wheel covers thus becoming visible and detracting from a vehicle's overall appearance. In addition to their aesthetics, the exposed lug nuts further become unsightly by rusting, or encrusting with a collection of dirt, brake dust road oil, and tar. In addition, it has been found that if the lug nuts are not covered by the wheel cover, the encrusted debris make it more difficult for the lug nut to be removed.

In the past decorative caps have been used to cover the exposed lug nuts, protecting them from road elements and making the lug nuts more aesthetically pleasing. These decorative caps are commonly secured to the lug nut by welding, press fitting, or curling flanges or other segments of the decorative cap into grooves or corresponding slots on the lug nuts so that the decorative caps are permanently secured thereto. The decorative caps are often made to be received by a standard lug wrench socket, which thereby requires that the covered lug nut be of a substandard size. If, at a later time, the decorative cap is damaged or falls off, it then becomes very difficult to remove the uncapped lug nut which is non-standard size. In an attempt to remedy this problem, U.S. Pat. No. 5,180,266 to Nolan discloses a decorative cap that is a deep drawn element having hollow hexagonal configurations adjacent to its outer close end and specially formed threads adjacent to its inner open end that inner lock with machine threads of the lug nut. Another device for covering and fielding a lug nut is disclosed in U.S. Pat. No. 5,181,767 to Hudgins, which discloses a retention arrangement for a vehicular wheel cover that uses protruding ends of the vehicle's studs that are received in open-bottomed wells formed in the wheel cover.

While both the '266 and '767 patents disclose various arrangements for covering a lug nut, the patents do not provide a means for attaching the decorative caps to the lug nut in such a way as to increase friction, torque, and feel when the decorative cap nuts are being applied. Moreover, the patents do not disclose a controllable ratcheting feature for attaching the decorative cap nut to the lug nut. In addition, a ratcheting feature is not disclosed such that the tightening torque of the decorative cap nut will be slightly less than the loosening torque of the decorative cap nut. A means also is not disclosed for the lug nut and the decorative cap nut to "bottom-out" thereby attenuating deflection of the wheel cover when the decorative cap nut is attached to the lug nut and providing a positive stop when the decorative cap nut is fully tightened.

SUMMARY OF THE INVENTION

The present invention eliminates the disadvantages inherent in the prior art by providing a fastener retention system for a vehicle that comprises a stud attached to, and projecting axially from, a brake system of the vehicle. The stud includes an outer surface that has a plurality of helical threads disposed thereon. Further included is a lug nut that has an end portion including an inner surface with a plurality of helical threads disposed thereon for screwingly engaging the helical threads of the stud. The end portion of the lug nut includes an outer surface having a plurality of helical threads disposed thereon. Moreover, a nut end, integrally formed with the end portion, is included and has a plurality of ramped teeth disposed radially thereon and opposite the end portion.

A decorative cap nut for covering, and fixedly attaching to, the lug nut is also included in the present system. The cap nut has an engagement end portion including an inner surface having a plurality of helical threads disposed thereon for screwingly engaging the helical threads disposed on the outer surface of the lug nut end portion, and a axial spacer attached to the engagement end portion. The axial spacer has a lower portion including a plurality of ramped teeth disposed radially thereon for ratchetingly engaging the ramped teeth of the lug nut during tightening or loosening of the decorative cap nut such that the tightening torque is slightly less than the loosening torque.

The ratcheting of the ramped teeth with the angled indentations of the lug nut provides increased friction, torque, and feel when the decorative cap nut is being applied to the lug nut. Moreover, the lug nut and the decorative cap nut "bottom-out" by the nut end of the lug nut and the lower portion of the axial spacer abutting when the decorative cap nut is fully tightened against the lug nut such that deflection of the wheel cover is attenuated and a positive stop is provided for the decorative cap nut thereby controlling and limiting deflection of the wheel cover.

Other objects, features and advantages of the present invention will become apparent by reference to the following detailed description when considered in conjunction with the accompanying drawings.

BRIEF DESCRIPTION OF THE DRAWINGS

In the drawings below, reference characters refer to like parts throughout the views, and wherein.

DESCRIPTION OF THE PREFERRED EMBODIMENT(S)

Figure 1:
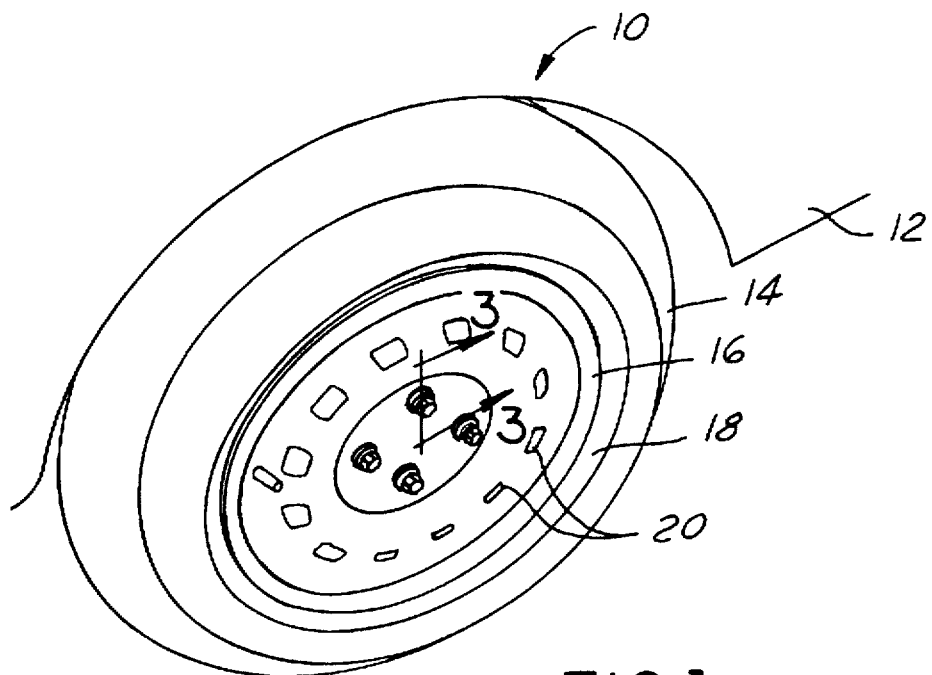
FIG. 1 is a perspective view of a fastener retention system for a wheel cover of a vehicle for the present invention.

Commencing with FIG. 1, a fastener retention system 10 for a wheel cover 16 of a vehicle 12 is shown. The wheel cover 16 of the fastener retention system 10 partially covers a wheel 18 of the vehicle 12. Surrounding and attached to the wheel 18 is a tire 14. Disposed in the wheel cover 16 are a plurality of apertures 20 and, in the preferred embodiment, four decorative cap nuts 24 projecting axially therefrom.

Figure 2:
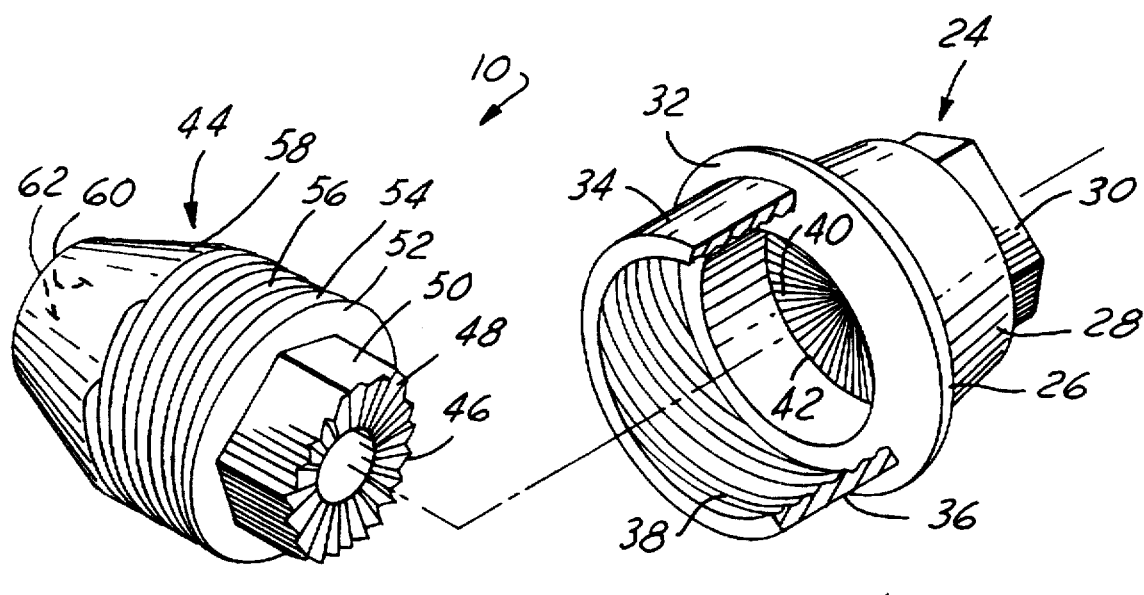
FIG. 2 is a perspective view of a lug nut in decorative cap nut, which is partially cut away, of the present invention.

As shown in FIG. 2, the fastener retention system 10 includes a hollow lug nut 44 having an intermediate portion 52 that is attached to or, in the preferred embodiment, is integrally formed with a tapered end portion 58. The intermediate portion 52 includes an outer surface 54 having a plurality of helical threads 56 disposed thereon. The lug nut 44 further includes a nut end 50 that is integrally formed with the intermediate portion 52 opposite the tapered end portion. 58. The nut end 50 includes a plurality of first ramped teeth 46 that are disposed radially on an upper portion 48 of the nut end 50 and disposed opposite the intermediate portion 52.

Figure 3:
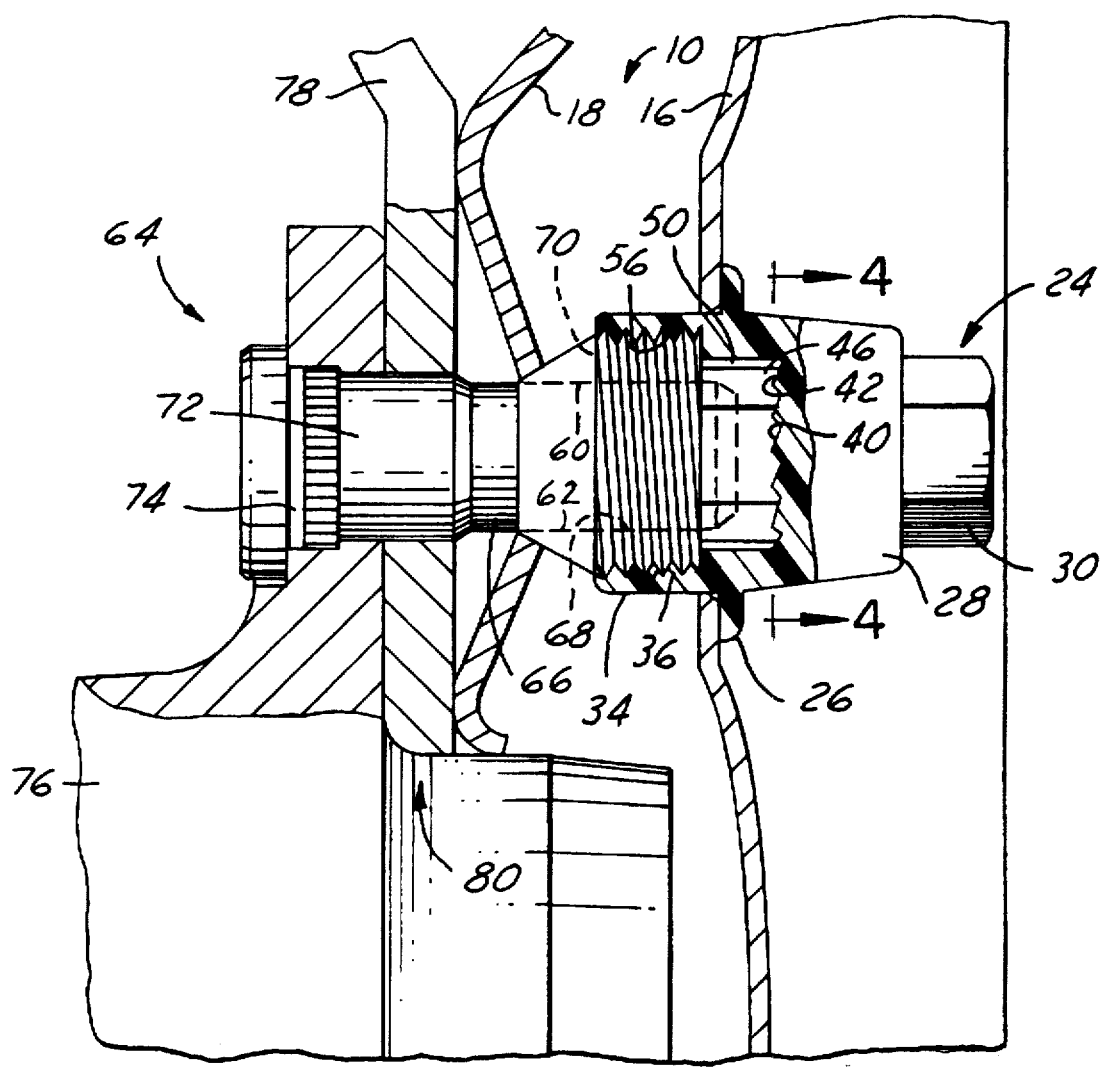
FIG. 3 is a side elevational view, and partial cut-away view, of the fully assembled fastener retention system of the present invention taken along sight line 3—3 of FIG. 1.
Figure 4:
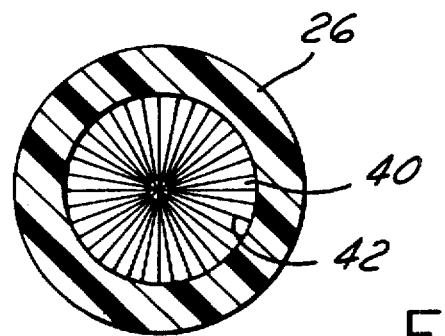
FIG. 4 is a cross-sectional view of a plurality of ramped teeth radially disposed on a lower portion of a axial spacer of the decorative cap nut of the present invention taken along sight line 4—4 of FIG. 3.

As shown in FIG. 3, the decorative cap nut 24 has an engagement end portion 34 that includes an inner surface 38 having a plurality of helical threads 36 disposed thereon for screwingly engaging the helical threads 56 disposed on the outer surface 54 of the intermediate portion 52 of the lug nut 44. The decorative cap nut 24 has a axial spacer 28 having a lower portion 42 that includes a plurality of second ramped teeth 40, as best shown in FIG. 4, which are disposed radially thereon. The second ramped teeth 40 ratchetingly engage the first ramped teeth 46 of the lug nut 44 during tightening or loosening of the decorative cap nut 24 such that the tightening torque is slightly less than the loosening torque and friction, torque, and feel is increased during application. The decorative cap nut 24 further includes a flange 26 that is integrally formed with, and projects radially outward from, the spacer 28. The flange 26 has a lower side 32 that, as shown in FIG. 3, abuts against the wheel cover 16. The decorative cap nut 24 further includes a hex nut 30 that is integrally formed with the axial spacer 28 opposite the radial flange 26.

When the first ramped teeth 46 meshingly engage the second ramped teeth 40 of the decorative cap nut 24, the nut end 50 of the lug nut 44 and the lower portion 42 of the axial spacer 28 abut such that the decorative cap nut 24 is fully tightened against the lug nut 44 and the lower side 32 of flange 26 is in full abutment with the wheel cover 16 thereby attenuating deflection of the wheel cover 16 during operation of the vehicle 12 and providing a positive stop for the decorative cap nut 24.

As is also shown in FIG. 3, the fastener retention system 10 of the present invention further includes a stud 64 having a first end 74 press fit into an axle spindle 76. The stud 64 further includes a second end 72 that is integrally formed with the first end 74 and projects axially from a brake system 80 of the vehicle 12. In the preferred embodiment, the brake system 80 of the vehicle 12 includes a disc brake rotor 78. The second end 72 includes an outer surface 68 that has a plurality of helical threads 70 disposed thereon. The threads 70 screwingly engage a plurality of corresponding helical threads 62 that are disposed on an inner surface 60 of the tapered portion 58 of the lug nut 44.

While the invention has been described in detail, it is to be expressly understood that it will be apparent to persons skilled in the relevant art that the invention may be modified without departing from the spirit of the invention. Various changes of form, design or arrangement may be made to the invention without departing from the spirit and scope of the invention. Therefore, the above mentioned description is to be considered exemplary, rather than limiting, and the true scope of the invention is that defined in the following claims.

What is claimed is:

1. A fastener retention system for a wheel cover of a vehicle of the type having a wheel and a brake system, the brake system having a threaded stud projecting axially therefrom, the wheel cover fastener retention system comprising:

a lug nut member having an end portion including an interior surface with a plurality of helical threads disposed thereon for screwingly engaging the vehicle's threaded stud, the end portion also including an outer surface having a plurality of helical threads disposed thereon, and a nut end integrally formed with the end portion;

said nut end of the lug nut member having a plurality of first ramped teeth disposed radially thereon and opposite to the end portion;

a decorative cap nut member for covering and fixedly attaching to the lug nut, said cap member having an engagement end portion including an interior surface with a plurality of helical threads disposed thereon for screwingly engaging the helical threads disposed on the outer surface of said lug nut's end portion, and said cap member having an axial spacer portion integrally attached to said engagement end portion; said spacer portion defining a lower wall portion extending normally to the cap nut member's axis; and wherein said nut end of said lug nut extends into said spacer portion of said cap nut member as said cap nut member is threaded on to said lug nut member and engages said lower wall portion of said cap nut's spacer portion when said cap nut member it is moved to a fully threaded engagement with said lug nut such that the vehicle's wheel cover is secured.

2. The fastener retention system of claim 1 wherein the lower wall of the axial spacer portion includes a plurality of second ramped teeth disposed radially thereon for ratchetingly engaging the first ramped teeth of the lug nut during tightening or loosening of the decorative cap nut.

3. A fastener retention system for a vehicle wheel cover, the vehicle having a wheel and a brake system, the brake system having a threaded stud projecting axially therefrom, the wheel cover fastener retention system comprising:

a lug nut member having an end portion including an interior surface having a plurality of helical threads disposed thereon for screwingly engaging the vehicle's threaded stud, said end portion including an outer surface having a plurality of helical threads disposed thereon;

said lug nut member having a nut end portion integrally formed with said end portion, said nut end portion including an upper portion opposite the end portion and having a plurality of first ramped teeth disposed radially thereon; and a decorative cap nut member for covering, and fixedly attaching to said lug nut member, said cap nut member having an engagement end portion including an interior surface having a plurality of helical threads disposed thereon for screwingly engaging said helical threads disposed on said outer surface of said end portion of said lug nut member;

said cap nut member defining an axial spacer portion attached to said engagement end portion, said axial spacer portion having a lower wall portion with a plurality of second ramped teeth disposed radially thereon for ratchetingly engaging said first ramped teeth of said lug nut during final threadable tightening and loosening of said decorative cap nut member.

4. The fastener retention system of claim 3 wherein said decorative cap nut member further includes a flange, integrally formed with projecting radially outward from said spacer portion, wherein said flange is adapted to engage the vehicle wheel cover.

5. The fastener retention system of claim 3 wherein said lug nut member further includes an intermediate portion which is integrally formed with said end portion.

6. The fastener retention system of claim 3 wherein said end portion of said lug nut member is adapted to engage the vehicle wheel.

7. The fastener retention system of claim 3 wherein said end portion of the lug nut is tapered.

8. The fastener retention system of claim 3 wherein said nut end portion of said lug nut member and said lower wall portion of said axial spacer portion engage one another as said decorative cap nut member is fully threadably tightened to said lug nut member whereby the wheel cover is capable of being retained.

9. The fastener retention system of claim 3 wherein said nut end portion of said lug nut member and said lower wall portion of said axial spacer portion engage as the decorative cap nut member is fully threadably tightened to said lug nut member in a manner providing a positive stop for the decorative cap nut member.

* * * * *